United States Patent [19]

Lauren

[11] Patent Number: 5,107,517
[45] Date of Patent: Apr. 21, 1992

[54] MELTING FURNACE

[75] Inventor: Henning J. E. Lauren, Pargas, Finland

[73] Assignee: Oy Partek AB, Pargas, Finland

[21] Appl. No.: 435,367

[22] PCT Filed: Apr. 28, 1988

[86] PCT No.: PCT/FI88/00064

§ 371 Date: Dec. 28, 1989

§ 102(e) Date: Dec. 28, 1989

[87] PCT Pub. No.: WO88/08411

PCT Pub. Date: Nov. 3, 1988

[30] Foreign Application Priority Data

Apr. 30, 1987 [FI] Finland ................ 871933
Mar. 10, 1988 [FI] Finland ................ 881135

[51] Int. Cl.⁵ ............................ H05B 7/00
[52] U.S. Cl. ............................ 373/18; 373/1;
373/22; 373/24; 373/79; 423/176; 423/442
[58] Field of Search .......... 373/1, 2, 3, 5, 18,
373/60, 80, 156, 19, 20, 22, 24, 79; 423/442,
176; 432/128, 146, 163

[56] References Cited

U.S. PATENT DOCUMENTS

| | | | |
|---|---|---|---|
| 750,094 | 1/1904 | Cowles | 423/442 |
| 2,015,642 | 9/1935 | Walker | 423/176 |
| 3,156,753 | 11/1964 | Gruber | 373/1 |
| 3,666,250 | 5/1972 | Hensenne | 373/156 |
| 3,899,628 | 8/1975 | Hirt | 373/2 |
| 4,697,274 | 9/1987 | Enkner et al. | 373/79 |
| 4,998,486 | 3/1991 | Dighe et al. | 373/18 |

FOREIGN PATENT DOCUMENTS

| | | |
|---|---|---|
| 2472729 | 1/1985 | France . |
| 63649 | of 1944 | U.S.S.R. . |
| 164022 | of 1963 | U.S.S.R. . |
| 1314034 | 4/1973 | United Kingdom . |
| 2093574 | 9/1982 | United Kingdom . |

Primary Examiner—Bruce A. Reinolds
Assistant Examiner—Tu Hoang
Attorney, Agent, or Firm—Cushman, Darby & Cushman

[57] ABSTRACT

A furnace for producing a melt for mineral wool production includes a shaft for preheating and melting of the raw material. A water-cooled grate is disposed in the bottom portion of the shaft, which supports a bed of ceramic filling bodies as well as the raw material. A combustion chamber is disposed underneath the shaft, which has a bottom portion for collecting the melt dripping from the shaft and an outlet for melt tapping. At least one main burner is disposed in the combustion chamber. Auxiliary burners are disposed above the grate. The bottom surface of the combustion chamber is larger, preferably 20 to 400% larger, than the transverse cross-sectional area of the shaft.

12 Claims, 3 Drawing Sheets

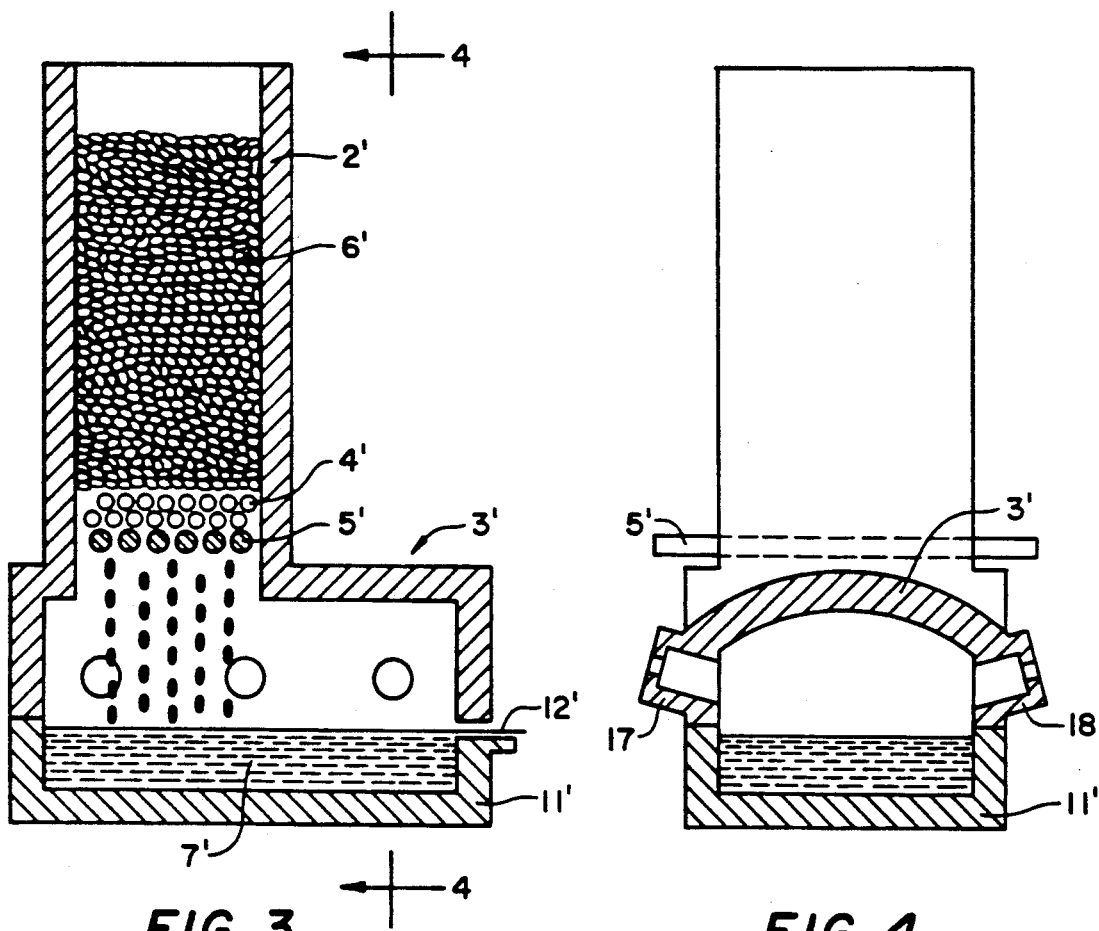
FIG. 3
FIG. 4
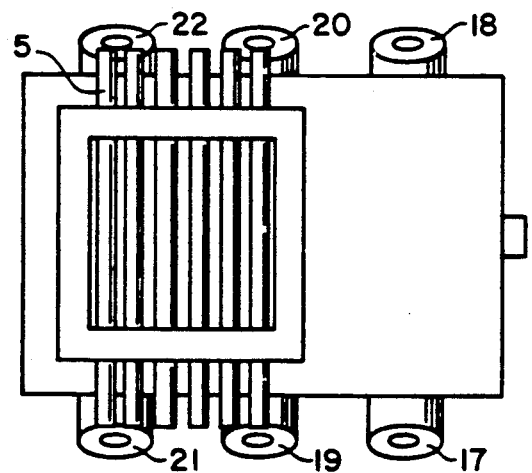
FIG. 5

MELTING FURNACE

BACKGROUND OF THE INVENTION

The present invention relates to a furnace for producing a melt for mineral wool production In mineral wool production, minerals of silicon and metal oxides or carbonates and/or slag are used as raw material. The raw material is melted in a furnace and the melt is fed into a fiberizing unit, which converts the mineral melt into fibres. During the fiberizing, a binding agent is added, which upon a thermal treatment fixes the fibres into each other so as to provide a shape permanent product. In order to provide a product of good quality, it is vital that the melting be regular and that the viscosity of the melt and the flow from the furnace to the fiberizing unit be constant.

The most commonly used type of melting furnace is a water-cooled cupola furnace, which is charged with a mixture of mineral raw material and coke. An inlet for combustion air is provided in the cupola furnace, and the combustion air is usually preheated to about 500° C. Stone raw material of a basalt or diabase type melts at a temperature of about 1200° C. The melt is overheated in the furnace so as to flow out of the furnace at about 1450° C. Due to the coke intermixed with the mineral raw material, the melting in the cupola furnace takes place in a reducing atmosphere. The exhausted flue gases then typically contain 8 to 10% of unburned carbon monoxide (CO) and a small amount of hydrogen sulphide ($H_2S$) and also sulphur dioxide ($SO_2$).

A serious drawback of the cupola furnaces is that they in most cases for environmental reasons have to be equipped with a gas purifier, which separates the dust and afterburns the flue gases, and which also includes preheating of the combustion air. Such a gas purifying and afterburning equipment is usually more complicated and expensive than the cupola furnace for the melting. Another drawback involved with the reducing atmosphere when using cupola furnaces charged with coke is that the iron oxide present in the raw material is reduced into metallic iron, whereby the furnace has to be equipped with a device for iron tapping. The iron tapping, which takes place every four hours, also causes a production stop of about 15 minutes.

In addition, cupola furnaces using natural gas as additional fuel have been manufactured for energy saving reasons, whereby a maximum of 25 to 30% of the coke has been replaced with gas. However the problem of incomplete burning remains, requiring afterburning, waste gas purification and iron tapping, which again involves a production break.

Other types of melting devices are electric furnaces of a tank type, in which the melting energy is supplied by three graphite electrodes fed with 150 to 200V alternating current and 10 000 to 20 000 A current. The amounts of exhaust gas from an electric furnace are normally small enough not to need purifying. Besides this environmental advantage, the electric furnace also has the advantage of allowing more freely the choice of raw material (finely divided) and also yields a more regular melt flow and temperature than the cupola furnace. However, the electric furnace has the drawback of incurring about four times higher equipment expenses than a cupola furnace with gas purification, and that of requiring a very refined and expensive energy form.

Moreover, gas or oil heated melting tanks of a similar type as the ones used in glass industry are being used, possibly with a 5 to 10% energy addition through molybdenic electrodes. Gas heated tanks incur somewhat more expensive equipment costs than electric furnaces of a tank type, and comprise approximately twice as large a melt bath surface for the same capacity. Gas and oil have the advantage of being easily available fuels, whereas gas or oil heated tanks have the drawback of a lining endurance of only 3 to 4 years and the reconstruction costs represent about 30 to 40% of a newly constructed tank.

All the above furnace types have their own advantages and drawbacks, preventing any of them from being ideal, however the trend today is to use electric or gas heated furnaces for environmental reasons (mainly sulphur).

As noted above, the latter furnaces have the drawback of being markedly more expensive than cupola furnaces with flue gas purification, being at the same time less flexibly adaptable to a discontinuous operation during weekends or for instance 1 or 2 shift operation. The cupola furnace comprises only a few hundred kilograms of melt at its bottom, whereas the tank furnaces have a melt quantity of several tens of tons. For that reason the cupola furnace may run down and be emptied of melt very rapidly without noticeably loosing production time. Likewise, the cupola furnace may be run up in a very short time in 1 or 2 shift operation, usually in about 1 hour. On the other hand, the running up of tank furnaces lasts 1 to 3 days, signifying that they cannot be made flexible in view of a discontinuous operation.

GB patent specification 1 326 884 discloses among others a gas heated iron melting furnace of a cupola furnace type, in which the melting takes place in a shaft, the bottom part of which comprises a water-cooled grate, which supports the iron raw material to be melted, and a bed of ceramic graphite blended filling bodies, which slowly melt down and are mixed with the melted slag, the iron melt being simultaneously carburized. The iron melt deriving from such a furnace has a temperature of about 1350° C. and requires the temperature to be raised to the proper casting temperature, which usually is done in a separate induction furnace.

SUMMARY OF THE INVENTION

The object of the present invention is to provide a furnace for producing a melt for mineral wool production, by which the above drawbacks of prior known mineral melting furnaces have been eliminated. Consequently, the present invention relates to a melting furnace that is not detrimental to the environment, yields a regular flow, the temperature of which equals the final working temperature, incurs fairly low equipment costs and is adaptable to a discontinuous operation.

The present invention relates in particular to a melting furnace comprising an essentially vertical shaft for receiving, preheating and melting of the mineral raw material; a water-cooled grate disposed in the bottom portion of the shaft, which supports said raw material and ceramic filling bodies; a combustion chamber disposed underneath the shaft comprising a bottom portion for collecting and overheating of the mineral melt dripping from the shaft and an outlet for tapping off the melt; and at least one main burner disposed in the combustion chamber. The main burner may use gaseous fuel, liquid fuel or pulverized coal fuel.

A melting furnace of the above type is disclosed by the GB patent specification 1 326 884. However, this prior known melting furnace is exclusively intended and used for iron melting.

Thus, the present invention relates to a melting furnace of the above basic type, however modified according to the invention so as to be useable for producing a melt for miner 1 wool production.

The ceramic filling bodies, which form a porous bed permeable to the hot exhaust gases from the subjacent combustion chamber, support the raw material to be melted and enlarge the surface of the mineral melt flowing down along them, to obtain an increased surface of contact between the melt and the gases for an initial overheating of the melt. The filling bodies consist of a refrac-refractory material, which has to resist the attack of the mineral melt as well as possible. Appropriate melt resisting materials are for instance silicon carbide and various chromium oxide bound and aluminium oxide containing materials. The bodies are heated by the hot exhaust gases and cooled again by the melt flowing down over them. At the same time they also maintain the porosity of the bed. They are preferably spheres having a diameter of 100 too 200 mm.

According to a feature of the the invention, the bottom surface of the combustion chamber, i.e. the surface of the melt bath, is larger, preferably 20 to 400% larger than the transverse cross-sectional area of the shaft, to enable the heat from the flames to further raise the temperature of the melt to about 1450° C. before the exhaust gases flow upwards through the shaft at about 1600° C. Thus, there will be produced a melt in the furnace, which can be directly led to the fiberizing unit. A further advantage of the larger bottom area of the combustion chamber is that the melt is prevented from flowing down along the combustion chamber walls and causing erosion of the wall material. The bottom of the combustion chamber may be of a square, hexagonal, oval or circular shape, other shapes being equally possible. The walls of the combustion chamber may be perpendicular or oblique.

According to a preferred embodiment, the melting furnace comprises in addition to the main burners also auxiliary burners, which are disposed annularly above the water-cooled grate. The fuels used for these are gaseous fuels, like natural gas or liquid gas and the auxiliary burners preferably operate with cold, possibly oxygen-enriched air. The task of the auxiliary burners is especially to ensure a regular melting off, thus avoiding the forming of tunnels in the shaft. The auxiliary burners are also crucial for draining the shaft before production stops during weekends and the like.

The energy amount supplied by the auxiliary burners is preferably in the range of 15 to 30% of the total amount of required energy. The number of auxiliary burners is preferably 10 to 30. The shaft and the combustion chamber are entirely lined with appropriate fireproof lining materials.

Various kinds of stones, slag or mixtures of these may be used as raw material. In addition, dolomite or limestone may be added.

An appropriate fraction of the raw material is 40 to 80 mm, and with this fraction, the raw material bed acts as a dust filter in the shaft, and thus the dust amount from this type of furnace is in most cases small enough not to require any dust filter.

The heating of the raw material to the melting temperature of about 1200° C. is done by convection heat transmission from the hot exhaust gas to the lump raw material. The melting also takes place in a neutral or mildly oxidating atmosphere and hence no unburned gases flow out of the furnace. There is no reduction of the iron oxide portion of the raw material, and thus no iron tapping device needs to be provided in the furnace, which is the case with coke heated cupola furnaces and electric furnaces with graphite electrodes.

The combustion chamber is equipped with one or preferably a plurality of main burners of a conventional type. A gaseous fuel, like natural gas or liquid gas or a liquid fuel, like oil, is preferably used, but also pulverized coal is usable. In order to achieve a higher combustion temperature, preheated combustion air may be used. Oxygen gas may also be intermixed in the combustion air. The burners are preferably directed towards the surface of the melt bath.

The melting furnace may also be equipped with various devices for overheating the melt by electric energy through electrodes of a known type, such as for instance molybdenic electrodes.

The overheating of the melt in the bottom section of the furnace can also be accomplished with plasma energy directly in the combustion chamber, whereby the plasma energy passes from a water-cooled electrode in the arch of the furnace through the melt to an electrode in the furnace bottom.

The electric additional energy supplied by electrode or plasma technique represents a maximum of 20% of the total energy required.

In order to improve the energy recovery of the melting furnace, the outlet duct of the exhaust gases having a temperature of about 700° to 800° C. may be provided with a recuperator for preheating the combustion air.

A significant advantage of the structure of the furnace according to the invention is the possibility of refeeding directly into the melt space the solidified waste melt, which has not been fiberized during the fiberizing process, and which thus has been removed from the fibre field. This waste melte is mostly a high quality material, which advantageously is to be returned into the process. When using cupola furnaces, this is not possible without briquetting. A further advantage is achieved by the fact that this structure of the furnace allows the feeding of finely divided additional material directly onto the surface of the melt bath.

BRIEF DESCRIPTION OF THE DRAWINGS

The invention is described in detail below with reference to the attached drawings, in which:

FIG. 3 shows a vertical section through another preferred embodiment of the melting furnace according to the present invention, FIG. 4 shows a vertical section through the combustion chamber of the melting furnace along the line B—B of FIG. 3, and FIG. 5 shows the same melting furnace as FIG. 3 seen from above.

DETAILED DESCRIPTION

Figure 1:
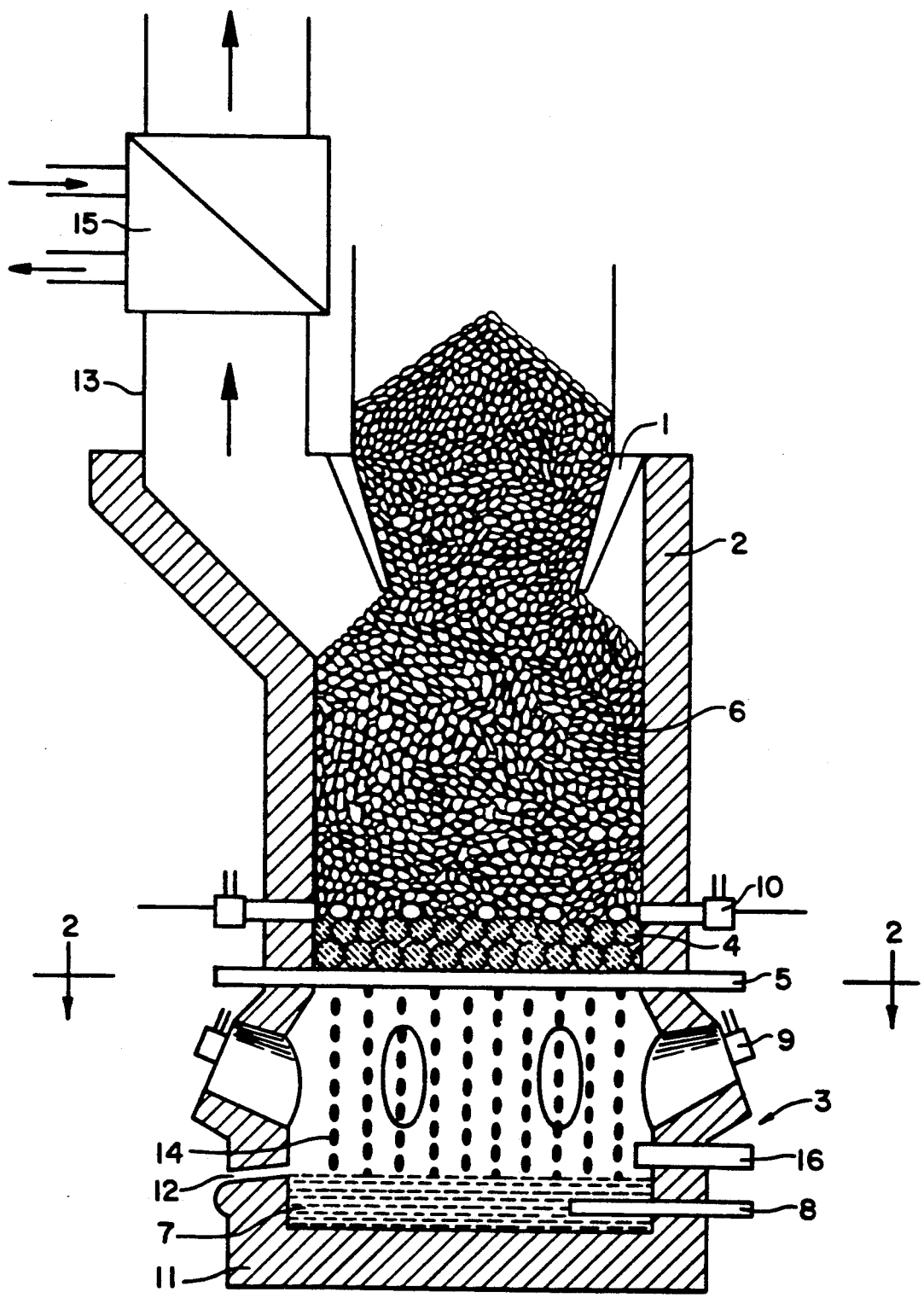
FIG. 1 presents a vertical section through a preferred embodiment of the melting furnace according to the present invention.
Figure 2:
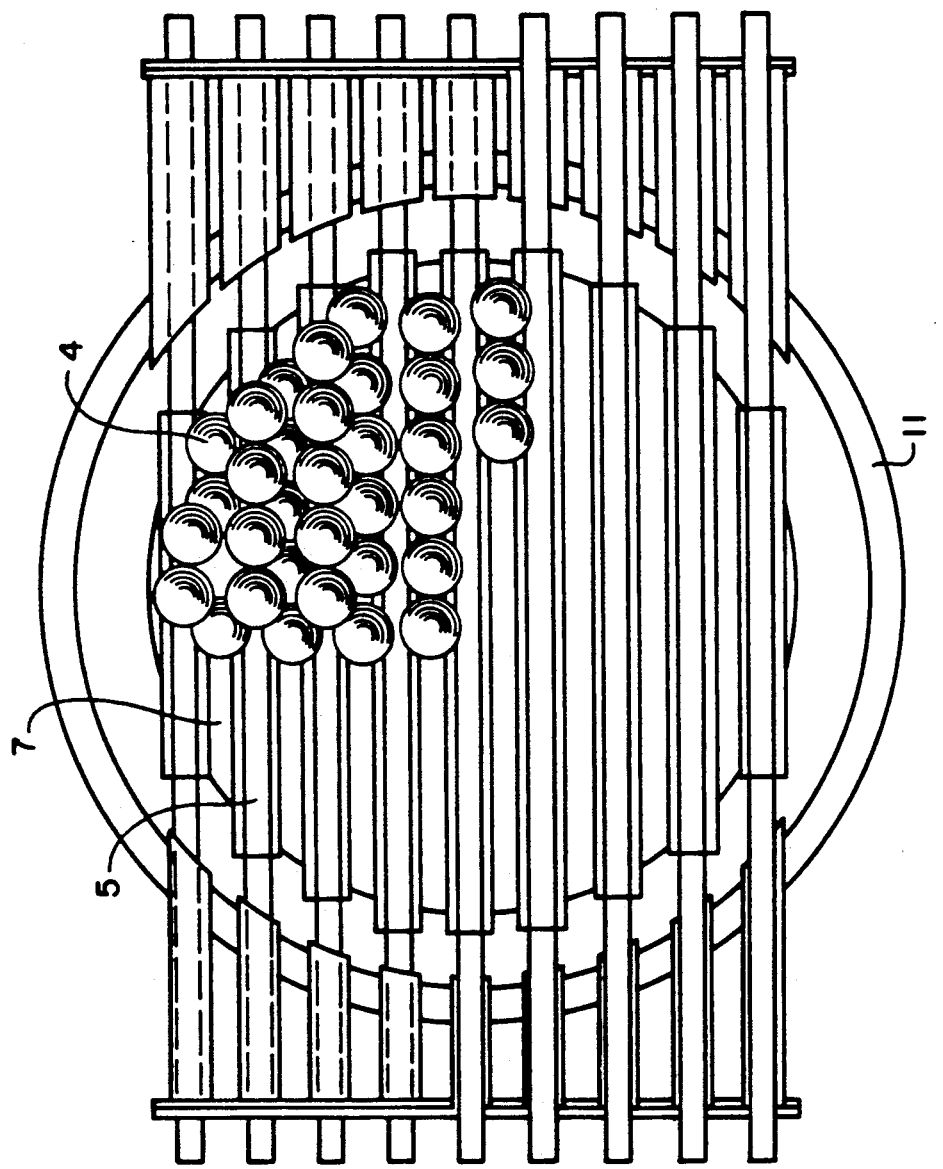
FIG. 2 presents a horizontal section along the line A—A of FIG. 1 on an enlarged scale.

The furnace shown in FIGS. 1 and 2 comprises a vertical preheating and melting shaft 2 for the charge, i.e. the stone material 6 to be melted (appropriate fraction 40 to 80 mm) and a combustion chamber 3 disposed underneath the shaft 2. The stone material 6 is charged into a water-cooled feeding shaft 1 disposed at the top of the shaft 2. At the bottom of the shaft 2 a water cooled grate 5 is provided, which supports a porous bed of ceramic spherical filling bodies 4 having a diameter of 100 to 200 mm and the stone material 6. The main burners 9 using gas, oil or pulverized coal as fuel are disposed annularly in the combustion chamber 3. The stone material 6 in the shaft 2 is preheated and heated to the melting temperature by heat transmission from the hot exhaust gases from the main burners 9. The melt 14 dripping from the shaft 2 is further collected in the bottom portion 11 of the combustion chamber and is overheated to the working temperature by heat transmission from the exhaust gases and by energy supply through the molybdenic electrodes 8 and is tapped off through an outlet 12 which is disposed at a certain height above the bottom of the combustion chamber 3, so that a melt bath 7 is formed in the said bottom portion 11. The great electric current from the molybdenic electrodes 8 through the melt cause the melt to be brought into motion, resulting in a homogenization of the melt.

The main burners 9 are directed towards the surface of the melt bath 7, whereby the heat from the fuel flames transferred to the melt before the exhaust gases at about 1600° C. flow up into the shaft 2. The hot exhaust gases are turned away from the shaft 2 through the duct 13. A recuperator 15 for the hot exhaust gases can be disposed in the duct 13 for preheating the combustion air used in the main burners 9.

Auxiliary burners 10 using gas as fuel are disposed annularly above the water-cooled grate 5. The auxiliary burners 10 contribute to the melting of the stone material 6. However their main task is to prevent the forming of tunnels in the melting stone material and to purify the bed of ceramic filling bodies 4 during run-down.

The bottom portion 11 of the combustion chamber is provided with a ceramic lining, which is particularly exposed to the hot melt, whereby the lining has to be renewed from time to time, and hence the portion 11 may be formed so as to be removable for a rapid exchange with another newly lined bottom portion.

The melting furnace according to the invention can also be equipped with a device, for instance a feed screw 16, for refeeding of fiberizing residues directly into the combustion chamber.

An appropriate bottom surface of the combustion chamber 3 is to $10^m$ and an appropriate transverse cross-sectional area of the shaft 2 is about 3 m$^2$ for a furnace having a melting capacity of about 5 t/h.

The furnace shown in FIGS. 3 to 5 comprise a vertical shaft 2' having a square transverse cross-sectional area. The shaft 2 comprises at its bottom a water-cooled grate 5', which supports a porous bed of ceramic spherical filling bodies 4' having a diameter of 100 to 200 mm. The stone material 6' (preferably the fraction 40 to 80 mm) is charged at the top of the shaft 2' (not shown). The stone material 6' is preheated and heated to the melting temperature by heat transmission from the hot exhaust gases from the burners 17 to 22 disposed in the combustion chamber 3'. The burners 17 to 22, using gas, oil or pulverized coals as fuel, are directed towards the surface of the melt bath 7', whereby the heat from the fuel flames is transmitted to the melt before the exhaust gases, at a temperature of about 1600° C., flow upwards in the shaft 2'. The melt tapping outlet 12' is disposed at a certain height above the bottom of the combustion chamber 3' so as to form a melt bath 7' in this bottom portion 11'. The lining of this bottom portion 11' is particularly exposed to the hot melt and has to be renewed from time to time, and for this reason this portion 11' can be formed so as to be removable for a rapid exchange with another newly lined bottom portion.

An appropriate bottom surface of the combustion chamber 3' is 4 to 10 m$^2$ and an appropriate transverse cross-sectional area of the shaft 2 is 3 m$^2$ for a furnace having a melting capacity of about 5 t/h.

Only a number of preferred embodiments of the invention have been described above, and the melting furnace according to the invention can of course be modified within the scope of protection of the claims.

I claim:

1. A melting furnace for melting raw material to produce a melt for mineral wool production, comprising:

first peripheral sidewall means and bottom wall means defining a combustion chamber;

second peripheral sidewall means supported on and extending upwardly from an upper end portion of said first peripheral sidewall means of said combustion chamber and defining a melting shaft for preheating and melting raw material for mineral wool production;

a water-cooled grate provided between said combustion chamber and said melting shaft at a lower end of said melting shaft;

a bed of ceramic filling bodies supported on said grate;

said melting shaft being arranged to receive and peripherally enclose a charge of raw material supported on said bed of ceramic filling bodies on said grate;

at least one main burner disposed under said grate in said combustion chamber for applying heat from below said grate to said charge of raw material, so that raw material near said bed of ceramic filling bodies melts, drips through said bed of ceramic filling bodies and grate and collects as a melt in a lower portion of said combustion chamber, at least partly on said bottom wall means;

at least one outlet provided from said lower portion of said combustion chamber at a level which is above said bottom wall means, and through which said melt can be tapped from said lower portion of said combustion chamber; and a plurality of auxiliary burners disposed above said grate, in said melting shaft, adjacent to said bed of ceramic filling bodies, said auxiliary burners being arranged for applying heat to said charge of raw material, for preventing channels from forming in said raw material as said raw material melts.

2. The melting furnace of claim 1, wherein:

said peripheral sidewall means of said combustion chamber abruptly enlarges downwardly in diameter immediately under said grate, so that said combustion chamber has a larger internal transverse cross-sectional area in said lower portion thereof than does said melting shaft above said grate proximally of said bed of ceramic filling bodies.

3. The melting furnace of claim 2, wherein:

said internal cross-sectional area of said lower portion of said combustion chamber at said level of said outlet, is from 20 to 400 percent greater than said internal cross-sectional area of said melting shaft.

4. The melting furnace of claim 1, wherein:
said auxilliary burners are at least partially directed so as to project heat towards said bed of ceramic filling bodies from peripherally outwardly of said bed of ceramic filling bodies.

5. The melting furnace of claim 1, wherein:
said ceramic filling bodies are made of chromium oxide-bound aluminum oxide, and have diameters in the range of 100 to 200 mm.

6. The melting furnace of claim 1, further including:
electrically powered means for applying additional energy to said melt in said combustion chamber for overheating and mixing said melt, so that said melt as tapped through said outlet is at a working temperature suitable for production of mineral wool therefrom.

7. The melting furnace of claim 6, wherein:
said electrically powered means comprise molybdenic electrodes projecting into said lower portion of said combustion chamber below said level of said outlet.

8. The melting furnace of claim 1, wherein:
said lower portion of said combustion chamber is separable from a remainder of said combustion chamber; and
said lower portion of said combustion chamber is provided with a removable and replaceable ceramic lining.

9. The melting furnace of claim 1, wherein:
said peripheral sidewall means of said combustion chamber are provided with means for recycling fiberizing residue directly into said combustion chamber.

10. The melting furnace of claim 1, wherein:
said melting shaft further includes in an upper portion thereof, a duct for venting from said furnace hot exhaust gases rising through said charge of raw material; and
a recuperator for preheating combustion air for supplying said main burner.

11. The melting furnace of claim 1, wherein:
said at least one main burner comprises a plurality of burners arranged in an annular arrangement around said peripheral wall of said combustion chamber.

12. The melting furnace of claim 1, further including:
a water-cooled feeding shaft axially protruding into an upper end portion of said melting shaft from above, for feeding said charge of raw material into said melting shaft.

* * * * *